United States Patent [19]

Baker

[11] 4,137,570
[45] Jan. 30, 1979

[54] WAVEFORM SYNTHESIZER

[75] Inventor: Richard H. Baker, Bedford, Mass.

[73] Assignee: Exxon Research & Engineering Co., Florham Park, N.J.

[21] Appl. No.: 846,697

[22] Filed: Oct. 31, 1977

[51] Int. Cl.² .................................................. H02M 7/537
[52] U.S. Cl. ...................................... 363/43; 363/132
[58] Field of Search ................. 363/17, 41, 43, 59, 363/60, 110, 131, 132

[56] References Cited

U.S. PATENT DOCUMENTS

| | | | |
|---|---|---|---|
| 3,248,633 | 4/1966 | Guarrera | 363/59 X |
| 3,371,232 | 2/1968 | Hannan et al. | 363/59 X |
| 3,851,182 | 11/1974 | Wallace | 363/60 X |

FOREIGN PATENT DOCUMENTS 2035223  1/1972  Fed. Rep. of Germany ............. 363/59

Primary Examiner—William M. Shoop
Attorney, Agent, or Firm—Kenneth Watov

[57] ABSTRACT

A circuit for inverting a DC voltage to an AC voltage having a predetermined waveform, includes first and second level shifting stages for providing selectively at their respective output terminals a voltage having the level of the DC voltage, or about twice the level of the DC voltage. A first pair of transistorized switches are included for concurrently and selectively connecting the output terminal of one of the level shifters to one end of a load, and ground to the other end, respectively, for driving current through the load in a particular direction and obtaining a desired level and polarity of voltage thereacross, or the switches are operated to ground both ends of the load. In generating a stepwise approximation of a symmetrical AC waveform, such as a sinewave, one level shifting stage is charging from the DC voltage supply while the other level shifting stage is discharging into the load, during each half-cycle of the AC voltage. A second pair of transistorized (or mechanical) switches are added for selectively connecting each one of the first pair of transistorized switches in parallel with a transistorized switch of each one of the first and second level shifting stages, respectively, for operating the waveform synthesizer at half-rated voltage, and twice-rated current. Also included is a control signal generator for operating the switches and level shifting stages in a manner providing in combination concurrent dynamic level shifting and pulse width modulation in synthesizing a desired AC waveform.

17 Claims, 8 Drawing Figures

WAVEFORM SYNTHESIZER

The field of the invention relates generally to electrical waveform synthesizers, and more particularly to DC or AC voltage converters.

Many different circuits are known in the art for converting a DC voltage into an AC voltage. These circuits tend to be very complex, requiring a large number of components, resulting in high cost and reduced reliability. Also, many of these prior art circuits are limited to converting a DC voltage into an AC voltage at a given frequency, and also the AC voltage is usually high in harmonics, which is undesirable in many applications.

The present invention is a waveform synthesizer circuit capable of converting a DC voltage into a desired AC waveform, such as a sinewave, for example. In a first embodiment, a first level-shifting stage is included for selectively applying a voltage having a level equal to or greater than that of a DC voltage supply to a pair of transistorized switches. A second level-shifting stage is included, permitting the two level shifting stages to be individually operated during alternate half-cycles of the AC waveform, respectively, thereby decreasing the duty cycle time for each one of the level-shifting stages. The transistorized switches of the two stages are selectively operated for applying this voltage across a load and driving current through the load in a given direction, or for grounding the load. In a second embodiment, in addition to the inclusion of a second level-shifting stage, a pair of mechanical or transistorized switches are included with the other pair of transistorized switches, respectively, and are operated for selectively providing either rated voltage and rated current operation, or half-rated voltage and twice-rated current operation.

In the drawings, where like items are indicated by the same reference designation:

Figure 1:
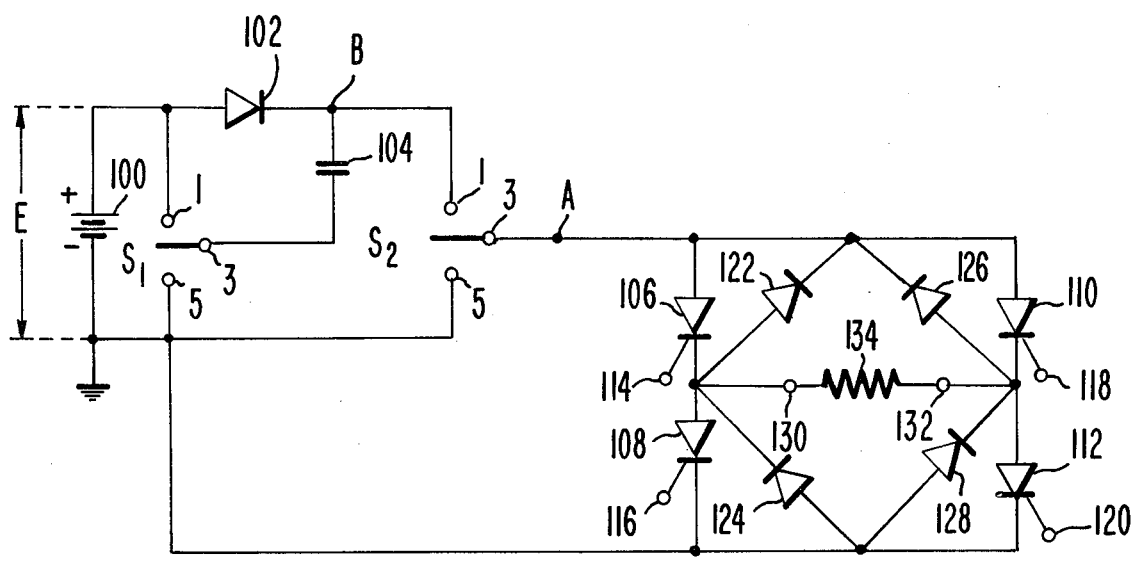
FIG. 1 is a circuit schematic diagram of a prior art DC to AC converter.

In FIG. 1, a prior art DC to AC converter includes a DC voltage supply 100 (shown as a battery) having a level of voltage equal to E volts, a level-shifting stage including a pair of switches $S_1$, $S_2$, a diode 102, and a capacitor 104; and a bridge-connected SCR mixer network including SCR's 106, 108, 110 and 112, each having a control terminal 114, 116, 118, 120, respectively; four diodes 122, 124, 126, 128; and a pair of output terminals 130 and 132 between which a load impedance 134 may be connected. In operation, when switch $S_1$ is operated to connect its pole 3 to its lower contact 5, the level of voltage at point B is about E volts, and capacitor 104 begins taking on charge. If switch 1 is maintained in its down position for a sufficient period of time, capacitor 104 will fully charge, resulting in a voltage drop across capacitor 104 of E volts. Thereafter, if switch $S_1$ is now operated to connect its pole 3 to its upper contact 1, the capacitor 104 is connected in series with the DC voltage supply or battery 100, raising the level of voltage at point B to 2E volts. Switch $S_2$ is operated to its upper position connecting its pole 3 to its upper contact 1, for applying the voltage at point B to point A, and to its lower position for connecting its pole 3 to its lower contact 5 for applying ground to point A. By selectively operating switches $S_1$ and $S_2$ between their respective upper and lower positions in different combinations at different times, the two-level unipolarity notched waveform shown in FIG. 2, can be obtained at point A, for example. Control signals are selectively applied to the operating terminals 114, 116, and 118, 120, of SCR's 106, 108, 110 and 112, respectively, for turning on and off in pairs, that is, 106 and 112 together, 108 and 110 together, to operate the mixer network for converting the two-level waveform of FIG. 2 into the four-level waveform of FIG. 3, for example. In this manner, a stepwise approximation of a sinewave can be generated, for example. A major disadvantage of this SCR mixer circuit is the complexity of the circuitry necessary to turn off the conducting ones of the SCR's 106–112, 108–110. It should be noted that an SCR is a solid-state switching device that can be turned on by applying a control signal to its control terminal, but can be turned off only by either interrupting the flow of current to its main current conduction path, or backbiasing the anode-cathode electrodes of its main current path.

Figure 4:
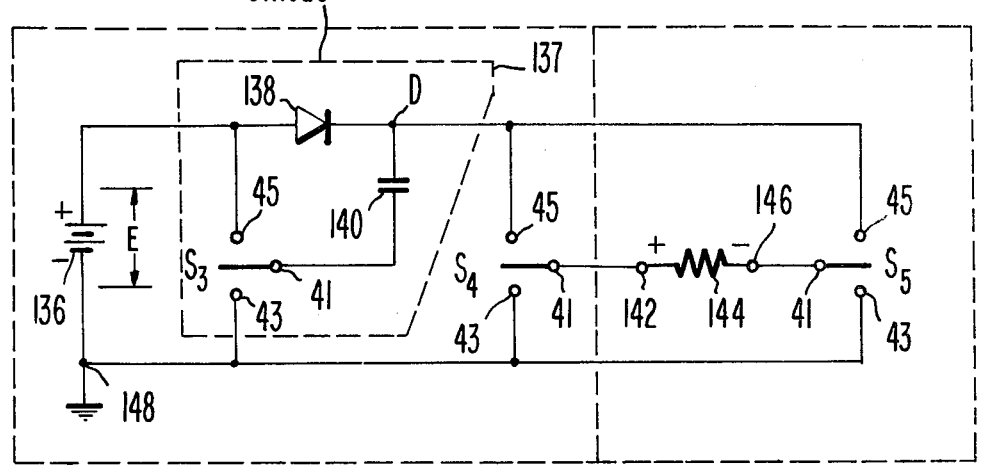
FIG. 4 is a circuit schematic diagram of a waveform synthesizer circuit.

In FIG. 4, a waveform synthesizer circuit includes a DC voltage supply or battery 136 having an output voltage of level E volts; at least one level-shifting stage 137 including a switch $S_3$, a diode 138, and a capacitor 140; and a pair of switches $S_4$, and $S_5$. The level-shifting stage 137 is identical in operation to the level-shifting stage $S_1$, 102, 104 of FIG. 1. As previously described, such a level-shifting stage 137 is capable of either unity gain level shifting or voltage doubling. As indicated in FIG. 4, such level-shifting stages 137 can be cascaded for selectively providing at point D, a voltage having a level equal to E volts 2E volts, 3E volts up to NE volts, where N is some integer number equal to the number of cascaded level-shifting stages 137. For the purposes of this discussion, it is assumed that only one stage of level shifting is provided (N= 1). The switches $S_3$ and $S_4$ correspond to the switches $S_1$ and $S_2$, whereas the switch $S_5$ replaces the entire SCR mixer circuit 106, 108, 110, 112, 122, 124, 126, 128 of FIG. 1.

Figure 2:
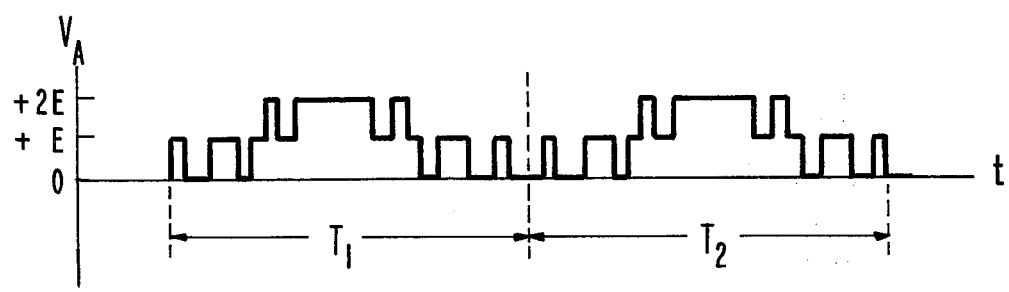
FIG. 2 shows a typical two-level unipolarity waveform that might be produced at point A in the circuit of FIG. 1.
Figure 3:
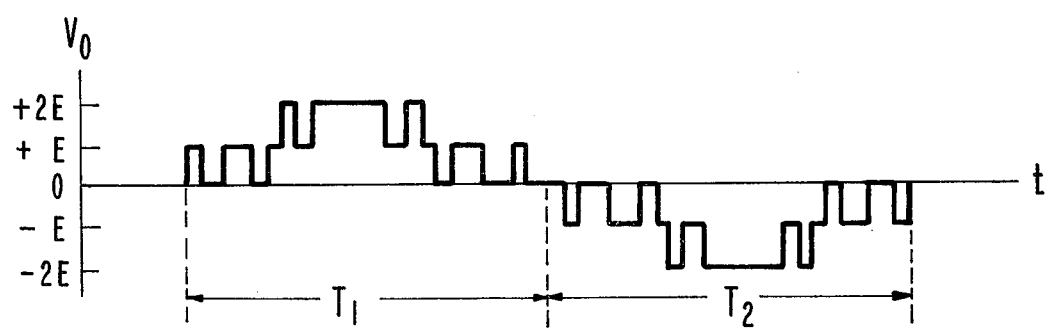
FIG. 3 shows a typical four-level notched stepwise approximation of an AC waveform, in this example a sinewave.

In operation, switch $S_3$ is operated to connect its pole 41 to its upper contact 45, or lower contact 43, for applying either E or 2E volts at point C, respectively. A typical waveform that can be so generated at point C is shown in FIG. 2, for example. The time duration for the waveform to be at any given level is determined by the length of time that the switch $S_3$ is held in either its upper or lower position. In this manner, dynamic level shifting is provided, concurrent with pulse width modulation of the voltage steps between the +E and +2E levels of voltage. The switch $S_4$ is operated to its upper position (arm 41 connected to contact 45) concurrent with switch $S_5$ being operated to its lower position (arm 41 connected to contact 43) for a direction of current flow from switch 4 to output terminal 142, through load 144, into output terminal 146, through switch $S_5$, to ground terminal 148, causing a voltage drop across the load 144 of the polarity indicated. For opposite direction of current flow through the load and a resultant opposite polarity of voltage across the load, switch $S_4$ is operated to its lower position (arm 41 connected to lower contact 43) concurrent with switch $S_5$ operated to its upper position (arm 41 connected to contact 45). For applying zero volt across the load, that is, grounding both output terminals 142 and 146, switches $S_4$ and $S_5$ are concurrently operated to their downward positions (arms 41 connected to contacts 43). In this manner, the bipolar waveform shown in FIG. 3 can be obtained, for example, from a waveform such as shown in FIG. 2 being generated at point C, as previously described. Such operation of the switches $S_4$ and $S_5$ also provides for pulse width modulation of the first steps or levels of voltage occurring between zero and $+E$ and zero and $-E$. The waveform shown in FIG. 3 is as previously mentioned a stepwise approximation of a sinewave, but it should be noted that through proper control of the switches $S_3$, $S_4$, $S_5$ many other non-sinusoidal stepwise approximated AC voltage waveforms, the frequency of which can be selectively varied, can be synthesized. In FIG. 3, the notches are placed at predetermined times and have predetermined widths, for reducing the harmonic content of the approximated waveform.

Figure 5:
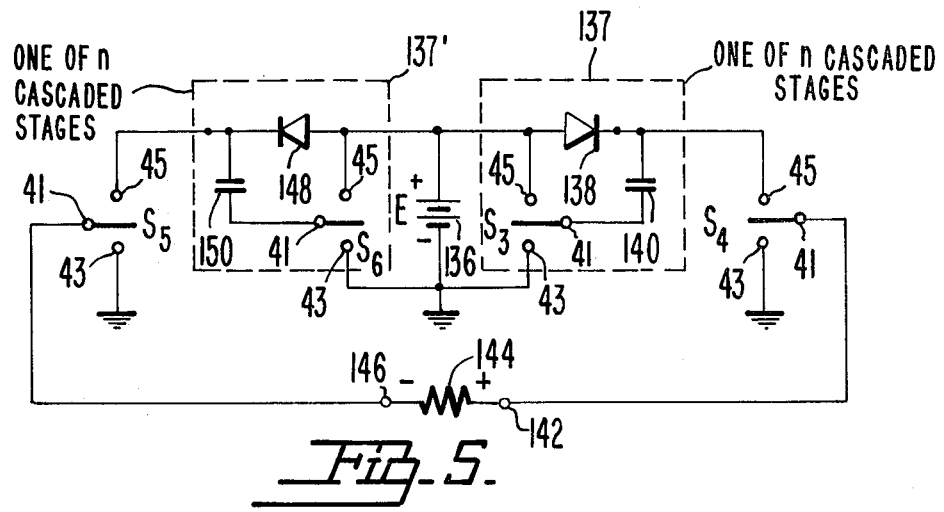
FIG. 5 is a circuit schematic diagram of a first embodiment of the invention.

In FIG. 5, a first embodiment of the invention is shown. The circuit is substantially identical to the circuit of FIG. 4, with the addition of a second stage of level shifting 137' or N'-cascaded stages of level shifting 137' (for purposes of this discussion N'=1). This additional stage of level shifting 137' is connected between the upper contact 45 of switch $S_5$ and the battery 136. The advantage of the circuit of FIG. 5 over that of FIG. 4 is that in generating a symmetrical waveform such as shown in FIG. 3, during a period of time $T_1$, switches $S_3$ and $S_4$ are operated to their upper positions, and switches $S_5$ and $S_6$ to their lower positions, for driving current through the load 144 in a direction to produce the polarity of voltage indicated, whereby capacitor 140 is discharging through the load and connected in series with the battery E, for producing the voltage steps $+2E$, for example. If switch $S_3$ is operated to its lower position, a voltage level of $+E$ is applied across the load 144 and the capacitor 140 takes on charge from the battery 136 via diode 138. During this period of time $T_1$, the capacitor 150 of the second level shifting stage is permitted to fully charge to the point where the voltage drop across capacitor 150 is substantially equal to E volts. During the time period $T_2$ of the next half-cycle of the stepwise approximated AC waveform shown in FIG. 3, switches $S_3$ and $S_4$ operated to their lower positions, switch $S_5$ to its upper position, and switch $S_6$ between its upper and lower positions for generating the $-E$ and $-2E$ levels of steps of voltage. By using at least two level-shifting stages 137, 137' in the manner shown in FIG. 5, in generating symmetrical waveforms such as shown in FIG. 3, the levelshifting stages 137 and 137' are required for active use during only alternate half-cycles of the AC waveform. Contrarywise, in the circuit of FIG. 4, the level-shifting stage 137 must be operated over the entire period or full cycle $(T_1 + T_2)$ of the AC waveform. Accordingly, the circuit of FIG. 5, in generating symmetrical waveforms, reduces the duty cycle of the level-shifting stages 137, 137' by a factor of one-half. Of course if nonsymmetrical waveforms are generated, then one or the other of the level-shifting stages 137 and 137' will be operated for more than half of the period of the nonsymmetrical waveform generated, in most instances. Accordingly, the circuit of FIG. 5 can be operated for generating a broader range of frequencies of synthesized waveforms, because the capacitors 140 and 150 are kept at a higher level of charge throughout the period of the generated waveform.

Figure 6:
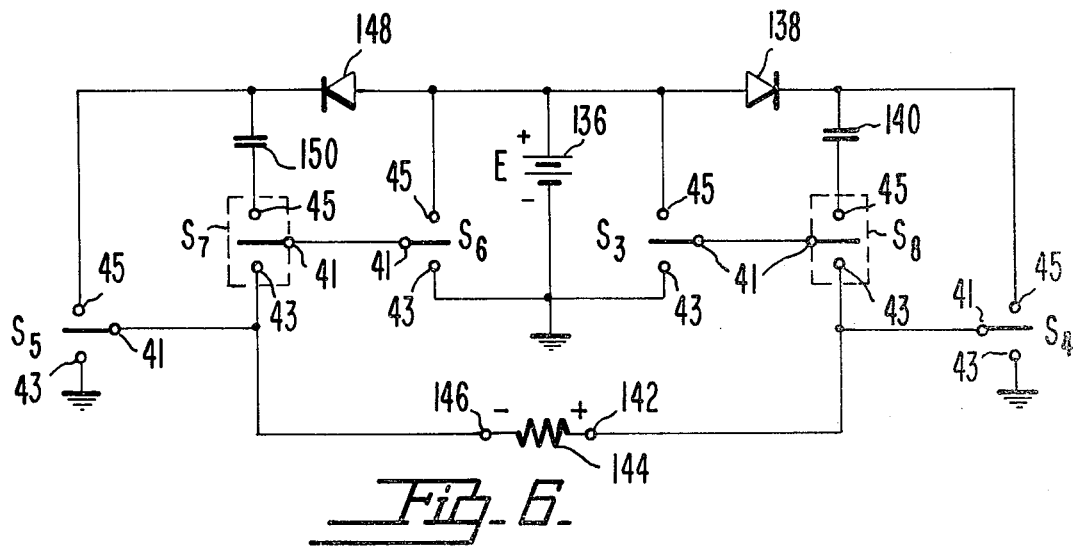
FIG. 6 is a circuit schematic diagram of a second embodiment of the invention.

In FIG. 6 a second embodiment of the invention is shown. In comparison to the embodiment shown in FIG. 5, a pair of switches $S_7$ and $S_8$ have been added as shown. In operation, if the switches $S_7$ and $S_8$ are operated to their upper positions, the operation of the circuit of FIG. 6 is identical to that of the circuit of FIG. 5. If the switches $S_7$ and $S_8$ are operated to their lower positions, the switches $S_5$ and $S_6$ are connected in parallel operation with respect to output terminal 146, and similarly, the switches $S_3$ and $S_4$ are connected in parallel with respect to ouput terminal 142. Accordingly, when switches $S_5$ and $S_6$ are operated to their upper positions, concurrent with switches $S_3$ and $S_4$ operated to their lower positions, current will flow from the battery 136 through switches $S_6$ and $S_7$ to output terminal 146, and from battery 136 through diode 148 and switch $S_5$ to output terminal 146, through the load 144 into output terminal 142, and therefrom both through switch $S_4$ to ground and through switches $S_8$ and $S_3$ to ground. Assuming that the switches $S_3$, $S_4$, $S_5$, $S_6$, $S_7$ and $S_8$ all have the same current rating, it should be clear that a magnitude of current twice that obtainable from the circuit of FIG. 5 can be supplied to the load 144, but only at a voltage level of E volts, for be necessity the capacitors 150 and 140 are out of the circuit. For reversing the flow of twice rated current through the load 144, the switches $S_5$ and $S_6$ are operated to their lower positions, and the switches $S_3$ and $S_4$ are operated to their upper positions. For applying zero volts across the load, switches $S_3$ through $S_6$ are operated to their lower positions, for example, thereby grounding output terminals 142 and 146. In other words, in operating the circuit of FIG. 6, with switches $S_7$ and $S_8$ in their upper positions, a voltage of up to $+2E$ volts can be applied across the load 144, and a magnitude of current equal to the current rating of the switches $S_3$ through $S_8$ can be driven through the load. With switches $S_7$ and $S_8$ operated to their lower positions, a voltage level of E volts can be applied across the load 144, and a current having a magnitude equal to twice the rated current magnitude of the switches $S_3$–$S_8$ can be supplied to the load 144. Such a circuit may be useful in operating an electric motor, for example, through a range of speeds at different levels of torque.

It should be noted that capacitors 140 and 150 can each be replaced by either a solar cell, a solar cell panel, a battery, a fuel cell, or any other electrical energy storage means. When any such substitution is made for capacitors 140 and 150, the diodes 138 and 148 can be eliminated (assume n=1 for FIG. 5). However, when batteries are substituted for the capacitors 140, 150 in many applications it is desirable to retain the diodes 138, 148 to permit recharging of the batteries at such times that the analogous one of capacitors 140 and 150 are charging, as previously described. Similarly, the battery 136 of FIGS. 5 and 6 can be replaced by either a solar cell, solar cell panel, fuel cell, and so forth.

Figure 7:
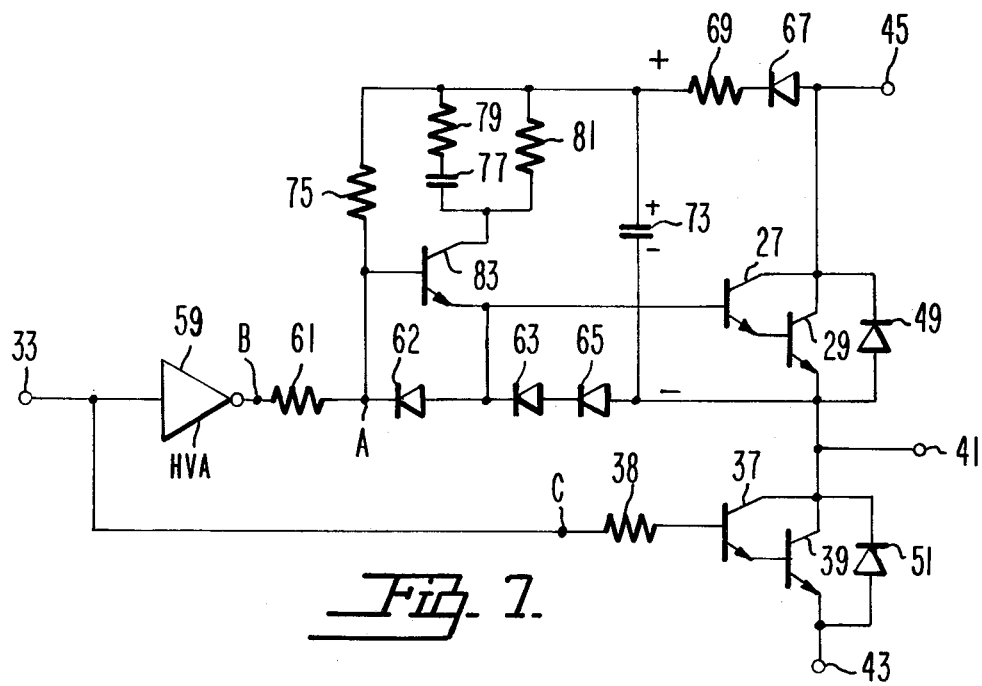
FIG. 7 is a circuit schematic diagram of a high-power switching amplifier.

In FIG. 7, a high-power switching amplifier circuit is shown, suitable for serving as each one of the switches S₃ through S₈ (see FIGS. 4–6). Of course, as previously mentioned, in FIG. 6 the switches S₇ and S₈ can each be mechanical or electromechanical, if desired. A detailed explanation of the operation of the switching circuit of FIG. 7 is found in my copending application U.S. Ser. No. 829,334, filed Aug. 31, 1977, for HIGH-POWER SWITCHING AMPLIFIER. Reference is made to FIG. 6 of this high-power switching amplifier application, which figure is identical to the circuit shown in FIG. 7 of the present application, even as to reference designations. For purposes of this discussion, it should be noted that the switching circuit of FIG. 7 is preferred for use in providing the switching functions of each one of the switches S₃–S₈, for switching current levels up to about 100 amperes at voltages at about 600 volts. For lower power applications, other transistorized switching circuits can be applied for use for providing each one of the switches S₃–S₈.

In FIG. 7, when a control signal having a positive level of voltage (hereinafter referred to as a level of "1") is applied to the control terminal 33, the NPN Darlington amplifier 37, 39 responds by turning on for substantially connecting output terminal 41 to ground via the main conduction path of the Darlington 37, 39, and the high voltage inverting amplifier 59 responds by producing a low-level or ground signal at point A. At this time, NPN transistor 83 is turned off, and diodes 62, 63, 65 and 67 are forward biased, permitting capacitor 73 to take on charge from the voltage source supplying the voltage applied to operating voltage terminal 45. When the control signal goes low (hereinafter referred to as level "0", the Darlington amplifier 37, 39 turns off, and the inverting amplifier 59 responds by changing the level of its output signal to a positive voltage. When point B is allowed to go positive (no longer held at a negative potential), diode 62 becomes back biased, and the current flowing through resistor 75 flows into the base electrode of and causes NPN transistor 83 to turn on. At the time of turnon of transistor 83, the speedup capacitor 77 appears as a short-circuit or closed conduction path, causing resistors 79 and 81 to be placed in parallel at the instant of turnon, and current flows from operating terminal 45 through the conduction paths including resistors 81, and resistor 79, in series with capacitor 77, the main conduction path of NPN transistor 83 (collector-emitter current path), into the base electrode of NPN transistor 27, thereby turning on the Darlington amplifier 27, 29. When the Darlington amplifier 27, 29 so turns on, current flows from the operating terminal 45 through the main current path of the Darlington amplifier 27, 29 to the output terminal 41, raising the level of voltage at the output terminal to a positive level, permitting capacitor 73 to begin discharging initially through the circuit of resistor 81 in parallel with a series circuit of resistor 79 and capacitor 77, the main current path of transistor 83, into the base electrode of NPN transistor 27. Once the speedup capacitor 77 becomes appreciably charged, it appears as an open circuit, effectively removing resistor 79 and itself from the parallel connection with resistor 81. Therefore, when this occurs, the effective resistance of the parallel circuit is increased to the value of resistance of resistor 81 through which all of the current is now passing. The speedup circuit of resistor 79 and capacitor 77 is known in the art, enhances the turnon time for transistor 83, and accordingly also the turnon time of the Darlington amplifier 27, 29. The capacitor 73, while discharging into the Darlington amplifier 27, 29, acts to increase the level of voltage applied to the base electrode (voltage at terminal 41 plus voltage across capacitor 73) of NPN transistor 27 to ensure that the Darlington amplifier 27, 29 goes into saturation for substantially applying the operating voltage connected to terminal 45 to output terminal 41. Resistors 69 and 38 are current-limiting resistors, and resistor 61 serves as an isolation resistor.

Figure 8:
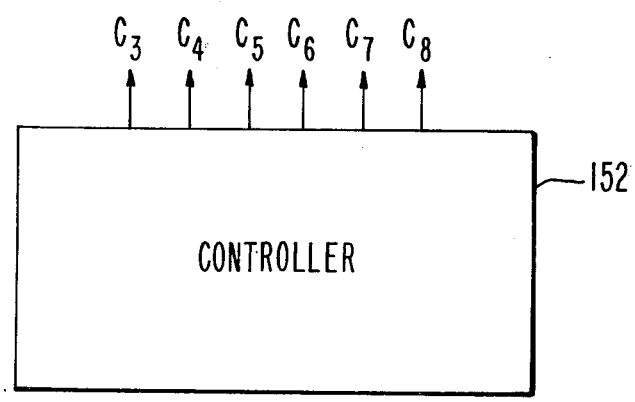
FIG. 8 is a block diagram of a controller for providing control signals for operating the various transistorized switches of the present invention.

Assume that each one of the switches S₃ through S₈ are provided by a transistorized switching circuit such as shown in FIG. 7. In such a case, six individual control signals herein designated as C₃ through C₈, must be applied to the respective control terminals 33 of each one of the switches S₃ through S₈, respectively, for operating these switches to produce a desired waveform. A controller, such as the block 152 shown in FIG. 8, is required to supply the control signals C₃ through C₈. In those applications where programmability is not important, that is, where only a single waveform is desired to be synthesized from a DC voltage source 136, the controller 152 can be hardwired digital logic. If it is required that any given one of a plurality of waveforms be synthesized at a given time, the controller 152 can be provided by a microprocessor, the microprocessor being programmed for producing the desired waveform. As shown in the State Table given below, the level of the output signal produced across a load for different combinations of a "1" state or "0" state for the control signals C₃–C₈ for FIGS. 4–6, are as follows:

STATE TABLE

| Circuit Figure No. | | $C_3$ | $C_4$ | $C_5$ | $C_6$ | $C_7$ | $C_8$ | Level of Output Voltage Across Terminals 142, 146 |
|---|---|---|---|---|---|---|---|---|
| FIG. 4 | | 1 | 1 | 1 | — | — | — | 0 |
| | | 1 | 0* | 1 | — | — | — | +E |
| | | 0* | 0 | 1 | — | — | — | +2E |
| | | 1 | 1 | 0* | — | — | — | −E |
| | | 0 | 1 | 0 | — | — | — | −2E |
| FIG. 5 | Normal Operating Range | 1 | 1 | 1 | 1 | — | — | 0 |
| | | 1 | 1 | 0* | 1 | — | — | −E |
| | | 1 | 1 | 0 | 0* | — | — | −2E |
| | | 1 | 0* | 1 | 1 | — | — | +E |
| | | 0* | 0 | 1 | 1 | — | — | +2E |
| | | 0 | 0 | 0 | 1 | — | — | +E |
| | | 0 | 0 | 0 | 0 | — | — | 0 |
| | | 1 | 0 | 0 | 0 | — | — | −E |
| FIG. 6 | Normal Operating Range | 1 | 1 | 1 | 1 | 1 or 0 | 1 or 0 | 0 |
| | | 1 | 1 | 0* | 1 | 0 | 0 | −E |
| | | 1 | 1 | 0 | 0* | 0 | 0 | −2E |
| | | 1 | 0* | 1 | 1 | 0 | 0 | +E |
| | | 0* | 0 | 1 | 1 | 0 | 0 | +2E |
| | | 0 | 0 | 0 | 1 | 0 | 0 | +E |
| | | 0 | 0 | 0 | 0 | 0 | 0 | 0 |
| | | 1 | 0 | 0 | 0 | 0 | 0 | −E |

STATE TABLE-continued

| Circuit Figure No. | | Control Signal | | | | | | Level of Output Voltage Across Terminals 142, 146 |
|---|---|---|---|---|---|---|---|---|
| | | $C_3$ | $C_4$ | $C_5$ | $C_6$ | $C_7$ | $C_8$ | |
| | Normal | 1 | 1 | 0 | 0 | 1 | 1 | −E Twice rated |
| | Oper. Range | 0 | 0 | 1 | 1 | 1 | 1 | +E Current Operation |

*Changed to a "1" state and back to "0" state to provide notching. Period of time in "1" state determines width of notch.

The high-power switching amplifier circuit of FIG. 7 is an inverting switching amplifier. Accordingly, if a noninverting transistorized switching amplifier is applied for use for providing the switching functions of the switches $S_3$ through $S_8$, the levels of the control signals given in the State Table above must be inverted, that is, "1" levels will become "0" levels, and "0" levels will become "1" levels.

What is claimed is:

1. A circuit for inverting a DC voltage to an AC voltage having a predetermined waveform, comprising:
   first and second terminals for receiving said DC voltage, said second terminal also being connected to a point of reference potential;
   first and second level shifting stages each having first and second input terminals connected to said first and second terminals of said inverting circuit, respectively, and an output terminal, each being operable to a first condition for applying said DC voltage to its respective output terminal, and to a second condition for applying a voltage greater in level than said DC voltage to its respective output terminal;
   first and second switching means each having a first input terminal connected individually to the output terminals of said first and second level shifting stages, respectively, a second input terminal connected in common to said second terminal of said inverting circuit, and an output terminal for individual connection to one and the other ends of a load, respectively, each one of said switching means providing a single-pole-double-throw switching action, each one of said switching means being operable to a first condition for providing a current conduction path between their respective first input and output terminals, and to a second condition for providing a current conduction path between their respective second input and output terminals; and
   means for selectively operating said first and second level shifting stages, and said first and second switching means, into different combinations of their first and second conditions, for obtaining said AC voltage.

2. The inverter circuit of claim 1, wherein said operating means operates said first and second level shifting stages, and said first and second switching means, for concurrently providing both dynamic level shifting and pulse width modulation, for obtaining said AC voltage having a selectively notched waveform for reducing harmonies.

3. The inverter circuit of claim 1, wherein each one of said first and second level shifting stages, includes:
   unidirectional current means connected between said first input and output terminals of said respective stages;
   electrical energy storage means having one end connected to said output terminal of said respective stages; and
   switching means connected between said first and second input terminals of said respective stages, providing a single-pole-double-throw switching action, the pole being coupled to the other end of said energy storage means, said switching means being operable to a first state for connecting the other end of said energy storage means to said second input terminal of its stage, permitting said energy storage means to charge concurrently with applying the DC voltage to said output terminal of its stage, thereby establishing the first condition for the stage, and operable to a second state for connecting the other end of said energy storage means to said first input terminal of said stage, placing the voltage developed across said energy storage means in series with said DC voltage, said unidirectional current means being poled for ensuring that said energy storage means cannot discharge through said unidirectional means, thereby establishing the second condition for the stage, at which time a level of voltage about twice that of said DC voltage is applied to the output terminal of the respective level shifting stage.

4. The inverter circuit of claim 3, wherein said unidirectional current means includes a diode.

5. The inverter circuit of claim 3, wherein said electrical energy storage means includes a capacitor.

6. The inverter circuit of claim 3, wherein said electrical energy storage means includes a battery.

7. The inverter circuit of claim 3, wherein said switching means of each one of said first and second level shifting stages, and said first and second switching means of said inverter circuit each include a bilateral solid-state switching circuit means.

8. The inverter circuit of claim 1, wherein each one of said first and second level shifting stages includes:
   a plurality of n cascaded voltage source stages, each including:
   unidirectional current means;
   electrical energy storage means;
   switching means providing a single-pole-double-throw switching function, having first and second power terminals, and an output terminal, said unidirectional current means and energy storage means being connected in a series circuit between said first power and output terminals, said second power terminal being connected to said second terminal of said inverter circuit, the common connection of said unidirectional current means and energy storage means being connected to the first power terminal of the next succeeding voltage source stage, the other end of said energy storage means being connected to said output terminal, the first voltage source stage of said cascaded stages having its first power terminal connected to the first terminal of said inverter circuit, and the last voltage source stages of each one of said first and second level shifting stages having the common connection of its unidirectional current means and energy storage means connected to the first input terminals of said first and second switching means, respectively;

said switching means of each one of said voltage source stages being operable in said first condition of its respective level shifting stage for providing a main current path between its output and second power terminals, for charging its energy storage means and applying said DC voltage to the common connection of its association energy storage means and unidirectional current means, and being selectively operable by said operating means in said second condition of its respective level shifting stage, for providing a main current path between its first power and output terminals, for connecting its associated energy storage means in a series circuit with other selected ones of the energy storage means of said voltage source stages, for applying a voltage having a level equal to the level of said DC voltage plus the sum of the voltages across each one of the series-connected energy sources to the common connection of said unidirectional current means and energy storage means of the nth voltage source stage.

9. The inverter circuit of claim 3, further including:
third switching means having a first input terminal connected to the other end of said energy storage means of said first level shifting stage, a second input terminal connected to the output terminal of said first switching means, and an output terminal connected to the output terminal of said switching means of said first level shifting stage; and
fourth switching means having a first input terminal connected to the other end of said energy storage means of said second level shifting stage, a second input terminal connected to the output terminal of said second switching means, and an output terminal connected to the output terminal of said switching means of said second level shifting stage,
said third and fourth switching means each being operable to a first condition for providing a current conduction path between their respective first input and output terminals, and to a second condition for providing a current conduction path between their respective second input and output terminals, whereby when said third and fourth switching means are concurrently operated to their first conditions, said inverter circuit is enabled for supplying rated current and voltage to said load, and when said third and fourth switching means are concurrently operated to their second conditions, said inverter circuit is enabled for supplying twice-rated current and half-rated voltage to said load.

10. The inverter circuit of claim 1, wherein each one of said first and second level shifting stages includes:
DC voltage supply means having first and second output terminals across which a DC output voltage is produced, said first output terminal being connected to said output terminal of said respective stage; and
switching means connected between said first and second input terminals of said respective stages, providing a single-pole-double-throw switching action, the pole being coupled to said second output terminal of said DC voltage supply means, said switching means being operable to a first state for connecting the second output terminal of said DC voltage supply means to said second input terminal of its stage, thereby applying the output voltage of said DC voltage supply means to said output terminal of its stage, establishing the first condition for the stage, and operable to a second state for connecting the second output terminal of said DC voltage supply means to said first input terminal of said respective stage, thereby establishing the second condition for the stage, at which time a level of voltage equal to the sum of said DC voltage and the output voltage from said supply means is applied to the output terminal of the respective level shifting stage.

11. The inverter circuit of claim 10, further including:
third switching means having a first input terminal connected to the second terminal of said DC voltage supply means of said first level shifting stage, a second input terminal connected to the output terminal of said first switching means, and an output terminal connected to the output terminal of said switching means of said first level shifting stage; and
fourth switching means having a first input terminal connected to the second terminal of said DC voltage supply means of said second level shifting stage, a second input terminal connected to the output terminal of said second switching means, and an output terminal connected to the output terminal of said switching means of said second level shifting stage.
said third and fourth switching means each being operable to a first condition for providing a current conduction path between their respective first input and output terminals, and to a second condition for providing a current conduction path between their respective second input and output terminals, whereby when said third and fourth switching means are concurrently operated to their first conditions, said inverter circuit is enabled for supplying rated current and voltage to said load, and when said third and fourth switching means are concurrently operated to their second conditions, said inverter circuit is enabled for supplying twice-rated current and half-rated voltage to said load.

12. The inverter circuit of claim 10, where DC voltage supply means includes a battery.

13. The inverter circuit of claim 10, where DC voltage supply means includes a solar cell panel.

14. The inverter circuit of claim 10, where DC voltage supply means includes a fuel cell.

15. A circuit for converting a DC voltage to a predetermined AC voltage having a desired amplitude, frequency, and waveshape, comprising:
first and second primary output terminals for connection to a load;
first and second secondary output terminals;
a first power terminal and a second power terminal for receiving said DC voltage, said second terminal also being connected to a point of reference potential;
first level shifting means connected between said first and second terminals, including electrical energy storage means, a control terminal for receiving a first control signal, responsive to said first control signal being "high" for concurrently connecting said first power terminal to said first secondary output terminal, and said energy storage means for charging between said first secondary output terminal and said second power terminal, and responsive to said first control signal being "low" for connecting said energy storage means between said first power terminal and first secondary output terminal, for applying a voltage greater in level than said DC voltage to said first secondary output terminal, during portions of one-half cycle of said AC voltage;

second level shifting means connected between said first and second power terminals, including electrical energy storage means, a control terminal for receiving a second control signal, responsive to said second control signal being "high" for connecting said first power terminal to said second secondary output terminal, concurrent with connecting its energy storage means for charging between said second output terminal and said second power terminal, and responsive to said second control signal being "low", for connecting its energy storage means between said first power terminal and said second secondary output terminal, for applying a voltage greater in level than said DC voltage to the latter terminal, during portions of the other half-cycle of said AC voltage;

first switching means connected between said first secondary output terminal and said second power terminal, having a control terminal for receiving a third control signal, responsive to said third control signal being "high" for connecting said second power terminal to said first primary output terminal, and to said third control signal being "low" for connecting said first secondary and primary output terminals together;

second switching means connected between said second secondary output terminal and said second power terminal, having a control terminal for receiving a fourth control signal, responsive to said fourth control signal being "high" for connecting said second power terminal to said second primary output terminal, and to said fourth control signal being "low" for connecting said second secondary output terminal to said second primary output terminal; and controller means for generating said first through fourth control signals for producing said predetermined AC voltage across said first and second primary output terminals.

16. A DC voltage to AC voltage converter capable of synthesizing a predetermined AC waveform at a given rated current and voltage in a first mode of operation, and at twice-rated current and one-half rated voltage in a second mode of operation, comprising:

an operating voltage terminal for receiving said DC voltage;

a common terminal for connection to a point of reference potential;

third and fourth terminals across which said AC waveform is produced, and for connecting a load therebetween;

first through sixth switching means each having a control terminal for receiving a first through sixth control signals, respectively, an output terminal, and first and second power terminals, said first and second switching means each having then first power terminals connected to said operating voltage terminal, said first through fourth switching means each having their second power terminals connected to said common terminal, the second power terminal of said fifth switching means being connected in common to the output terminal of said third switching means and said third terminal of said converter, the output terminals of said first and fifth switching means being connected together, the output terminals of said second and sixth switching means being connected together, the second power terminal of said sixth switching means being connected in common to the output terminal of fourth switching means and fourth terminal of said converter, each one of said switching means being responsive to their associated control signal being "high", for individually establishing a current conduction path between their respective output and second power terminals, and being responsive to their respective control signal being "low", for individually establishing a current conduction path between their respective output and first power terminals;

first unidirectional current means connected between and poled for passing current from said operating voltage terminal to said first power terminal of said third switching means;

second unidirectional current means connected between and poled for passing current from said operating voltage terminal to said first power terminal of said fourth switching means;

first electrical energy storage means connected directly between the first power terminals of said third and fifth switching means, respectively;

second electrical energy storage means connected directly between the first terminals of said fourth and sixth switching means, respectively; and control signal generator means for producing said first through sixth control signals in different combinations of "high" and "low" levels at predetermined times within given periods of time, for operating said first through sixth switching means to produce said AC voltage, whereby said third and fourth control signals are made "low" and "high", respectively, for passing current through said load in one direction, and contrariwise for passing current through said load in the opposite direction, said fifth and sixth control signals are each made "low" for placing said converter in its first mode of operation, in which mode said first control signal is made "high" for charging said first energy storage means and applying said DC voltage to the first power terminal of said third switching means, said first control signal is made "low" for connecting said first energy storage means between said operating voltage terminal and the first power terminal of said third switching means, for applying a voltage having a level greater than said DC voltage to said first power terminal of said third switching means, said second control signal is made high for concurrently charging said second energy storage means and applying said DC voltage to the first power terminal of said fourth switching means, said second control signal is made low for connecting said second energy storage means between said operating voltage terminal and the first power terminal of said fourth switching means, for applying a voltage having a level greater than said DC voltage to said first power terminal of said fourth switching means, and said fifth and sixth control signals are each made "high" for placing said converter in its second mode of operation, in this second mode said first and third control signals are each made "low" for connecting said DC voltage to said third terminal of said converter, and are each made "high" for connecting said reference potential to this latter terminal, said second and fourth control signals are each made "low" for applying said DC voltage to said fourth terminal of said converter, and are each made "high" for connecting said reference potential to said fourth terminal, accordingly in this second mode of operation said first and third switching means are operated in parallel, similarly for said second and fourth switching means.

17. A method for stepwise synthesizing from a DC voltage an AC voltage waveform, having a reduced harmonic content, comprising the steps of:

dynamically level shifting said DC voltage for obtaining alternatively but not necessarily successively two different levels of both positive and negative polarity pulses at different times within the time period of said synthesized AC voltage waveform, for selectively providing a notched waveform; and pulse width modulating said pulses substantially simultaneously with said level shifting step for selectively obtaining notch widths and pulse widths in a combination substantially reducing undesired harmonics.

* * * * *